US009572339B1

(12) United States Patent
Dicken

(10) Patent No.: US 9,572,339 B1
(45) Date of Patent: Feb. 21, 2017

(54) DECOY TROLLING APPARATUS

(71) Applicant: Roy Dicken, Poplar Bluff, MO (US)

(72) Inventor: Roy Dicken, Poplar Bluff, MO (US)

(*) Notice: Subject to any disclaimer, the term of this patent is extended or adjusted under 35 U.S.C. 154(b) by 234 days.

(21) Appl. No.: 14/469,101

(22) Filed: Aug. 26, 2014

Related U.S. Application Data

(60) Provisional application No. 61/944,288, filed on Feb. 25, 2014.

(51) Int. Cl.
*A01M 31/06* (2006.01)

(52) U.S. Cl.
CPC .................... *A01M 31/06* (2013.01)

(58) Field of Classification Search
CPC ...................................... A01M 31/06
USPC .......................................... 43/3, 2
See application file for complete search history.

(56) References Cited

U.S. PATENT DOCUMENTS

| 17,192 | A | * | 5/1857 | Bogle | B63B 17/02 |
| | | | | | 43/3 |
| 970,003 | A | * | 9/1910 | Wethall | A01M 31/06 |
| | | | | | 43/3 |
| 1,609,922 | A | * | 12/1926 | Wiig | A63G 3/00 |
| | | | | | 472/13 |
| 2,246,574 | A | * | 6/1941 | Coe | A01M 31/06 |
| | | | | | 43/3 |
| 2,252,795 | A | * | 8/1941 | Weems | A01M 31/06 |
| | | | | | 43/3 |
| 2,547,286 | A | * | 4/1951 | Sabin | A01M 31/06 |
| | | | | | 43/3 |
| 2,616,200 | A | * | 11/1952 | Milam | A01M 31/06 |
| | | | | | 43/3 |
| 2,624,144 | A | * | 1/1953 | Beverman | A01M 31/06 |
| | | | | | 43/3 |
| 2,726,469 | A | * | 12/1955 | Becker | A01M 31/06 |
| | | | | | 43/3 |
| 3,016,647 | A | * | 1/1962 | Peterson | A01M 31/06 |
| | | | | | 43/3 |
| 4,120,110 | A | * | 10/1978 | Aeschliman | A01M 31/06 |
| | | | | | 43/3 |
| 4,141,167 | A | * | 2/1979 | Muehl | A01M 31/06 |
| | | | | | 43/3 |
| 4,535,560 | A | * | 8/1985 | O'Neil | A01M 31/06 |
| | | | | | 43/3 |
| 4,660,313 | A | * | 4/1987 | Bauernfeind | A01M 31/06 |
| | | | | | 43/3 |

(Continued)

OTHER PUBLICATIONS

Duck Thang Motion Decoy System. Product Listing [online]. Duck Thang, 2012 [retrieved on Sep. 15, 2013]. Retrieved from the Internet: http://duckthang.com/.

(Continued)

*Primary Examiner* — Darren W Ark
(74) *Attorney, Agent, or Firm* — Robert C. Montgomery; Montgomery Patent & Design

(57) ABSTRACT

A decoy trolling apparatus includes a frame assembly floatable on a water surface, a plurality of decoys connected to the frame assembly and floatable on the water surface, a trolling assembly rigidly connected to a first location of the frame assembly, and an anchor assembly rotatably connected to a second location of the frame assembly and anchored to a ground surface below the water surface. The second location is opposed to the first location. The trolling assembly drives the frame assembly in a generally circular motion about the anchor assembly.

18 Claims, 6 Drawing Sheets

(56) References Cited

U.S. PATENT DOCUMENTS

| | | | | |
|---|---|---|---|---|
| 4,910,905 | A * | 3/1990 | Girdley | A01M 31/06 43/3 |
| 5,074,071 | A * | 12/1991 | Dunne | A01M 31/06 43/3 |
| 5,546,692 | A * | 8/1996 | Byers | A01M 31/06 43/2 |
| 5,906,067 | A * | 5/1999 | Layson | A01K 97/02 43/2 |
| 6,138,396 | A * | 10/2000 | Capps | A01M 31/06 43/3 |
| 6,665,975 | B2 * | 12/2003 | Porter | A01M 31/06 43/3 |
| 6,957,509 | B2 * | 10/2005 | Wright | A01M 31/06 43/3 |
| 7,043,865 | B1 * | 5/2006 | Crowe | A01M 31/06 43/3 |
| 7,963,064 | B2 * | 6/2011 | Smith | A01M 31/06 43/3 |
| 8,506,339 | B2 * | 8/2013 | Fletcher | A01M 31/06 43/3 |
| 8,950,103 | B2 * | 2/2015 | Bullerdick | A01M 31/06 43/3 |
| 9,167,807 | B1 * | 10/2015 | Hardebeck | A01M 31/06 |
| 9,366,381 | B1 * | 6/2016 | Hardebeck | A01M 31/06 |
| 9,402,387 | B2 * | 8/2016 | Goodman | A01M 31/06 |
| 9,414,583 | B2 * | 8/2016 | Burton | A01M 31/06 |
| 2008/0301995 | A1 * | 12/2008 | Brittingham, Jr. | A01M 31/06 43/3 |
| 2009/0272020 | A1 * | 11/2009 | Bill | A01M 31/06 43/3 |
| 2013/0212924 | A1 * | 8/2013 | Shisko | A01M 31/06 43/2 |
| 2016/0100569 | A1 * | 4/2016 | Hudson | A01M 31/06 43/3 |
| 2016/0242409 | A1 * | 8/2016 | Beauchamp | A01M 31/06 |

OTHER PUBLICATIONS

Duck Commander Wake Maker Automated Motorized Decoy System. Product Listing [online]. Forrester Manufacturing, 2010 [retrieved on Sep. 15, 2013]. Retrieved from the Internet: http://www.wakemakerducks.com/box_contents.html.

Dubba Robot Duck System. Product Listing [online]. Platte River Decoy Company, 2008 [retrieved on Sep. 15, 2013]. Retrieved from the Internet: http://www.platteriverdecoyco.com/home.html.

* cited by examiner

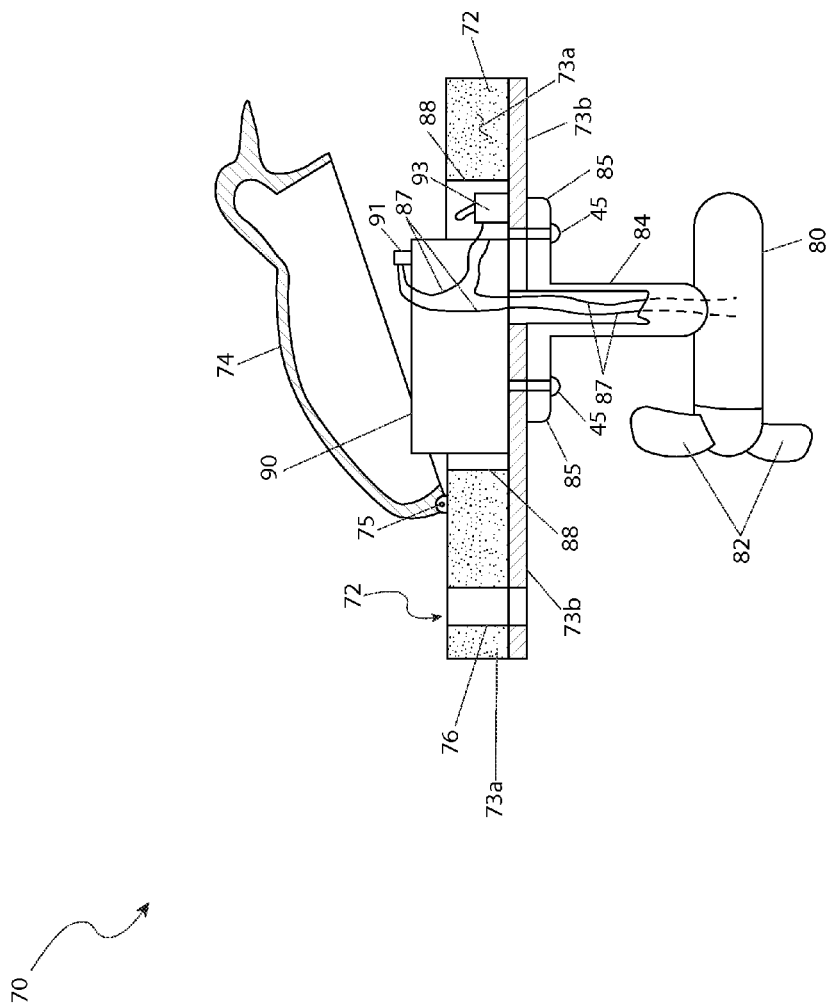

DECOY TROLLING APPARATUS

RELATED APPLICATIONS

The present invention was first described in and claims the benefit of U.S. Provisional Application No. 61/944,288, filed Feb. 25, 2014, the entire disclosures of which are incorporated herein by reference.

FIELD OF THE INVENTION

The present invention relates generally to hunting decoys and, more particularly, to a decoy trolling apparatus configured to simulate a natural swimming motion of a plurality of decoys.

BACKGROUND OF THE INVENTION

Over the years, modern advances in hunting equipment have enhanced the sport, providing hunters with increased success. Among these products, hunting decoys have become more realistic in design, easier to use, and typically provide for a more successful hunting outing.

However, most hunting decoys fail in realism due to their lack of movement. While many hunted animals will initially respond to a hunting decoy, their artificial nature becomes very obvious as the hunted game moves closer. In fact, the un-natural nature of decoys causes many hunted animals to become spooked, and run off. Ideally, if the decoy was capable of movement, not only would the hunted animal pay more interest to the decoy, but their attention would be drawn away from other elements in the environment, including the hunter, allowing for a greater chance of an accurate shot.

Accordingly, there exists a need for a means by which hunting decoys can be provided with realistic movement.

SUMMARY OF THE INVENTION

The inventor has recognized the aforementioned inherent problems and lack in the art and observed that there is a need for a decoy trolling apparatus that allows for increased realism from hunting decoys. The development of the present invention, which will be described in greater detail herein, substantially departs from conventional solutions to fulfill this need.

In one embodiment, the disclosed decoy trolling apparatus includes a frame assembly configured to float on a water surface, a trolling assembly connected to a first location of the frame assembly, an anchor assembly connected to a second location of the frame assembly and anchored to a ground surface below the water surface. The second location is opposed to the first location. The frame assembly is configured for attachment of a plurality of decoys. The trolling assembly drives the frame assembly in a generally circular motion about the anchor assembly.

In another embodiment, the disclosed decoy trolling apparatus includes a frame assembly floatable on a water surface, a plurality of decoys connected to the frame assembly and floatable on the water surface, a trolling assembly rigidly connected to a first location of the frame assembly, and an anchor assembly rotatably connected to a second location of the frame assembly and anchored to a ground surface below the water surface. The second location is opposed to the first location. The trolling assembly drives the frame assembly in a generally circular motion about the anchor assembly.

In another embodiment, the disclosed decoy trolling apparatus includes a rectangular frame assembly including a first end having at least one (1) first corner and an opposed second end having at least one (1) second corner. The second corner is diagonally opposed to the first corner. The frame assembly includes a plurality of piping members removably interconnected by a plurality of fittings to form a rectangular grid pattern defining a plurality of rectangular openings between the plurality of piping members, a buoyant material coupled to at least the plurality of piping members to float the frame assembly directly below the water surface, and a frame appendage extending outwardly and upwardly from the first corner. The decoy trolling apparatus includes a plurality of decoys being floatable on the water surface. The plurality of decoys including an appearance of a water fowl. The plurality of decoys are releasably connected to the plurality of piping members in the grid pattern upon the water surface. The decoy trolling apparatus includes a plurality of tether cords releasably interconnected between the plurality of decoys and the plurality of piping members. The decoy trolling apparatus includes a trolling assembly. The trolling assembly includes a base assembly rigidly connected to the frame appendage. The base assembly including a foam upper section defining an upper surface and a rigid lower section defining a lower surface. The trolling assembly includes a mounting tube extending downwardly from the lower surface of the lower section of the base assembly. The trolling assembly includes a trolling motor connected to the mounting tube. The trolling motor includes an exterior motor housing, a motor disposed within the motor housing, and a propeller operatively connected to the motor. The trolling assembly includes a decoy cover hingedly connected to the upper surface of the upper section of the base assembly. The decoy cover includes an exterior shell defining a hollow interior. The exterior shell includes an appearance of the water fowl. The trolling assembly includes an internal power supply disposed within the interior of the decoy cover. The power supply is electrically connected to the motor. The trolling assembly includes a selector switch electrically interconnected between the power supply and the motor. The decoy trolling apparatus includes an anchor assembly. The anchor assembly includes a cylindrical post including a first end and an opposed second end. The second end of the post includes a pointed end configured to penetrate a ground surface below the water surface. The anchoring assembly includes a cylindrical collar stationarily connected around the post between the first end and the second end of the post and a circular pivot plate rotatably connected to the post and supported by the collar. The pivot plate includes a central aperture suitably sized to receive the post. The anchoring assembly includes a ring connector movably connected to a peripheral edge of the pivot plate and a swivel clasp. The swivel clasp includes a first end connected to the ring connector and an opposed second end releasably connected to a piping member of the plurality of piping members at the second corner of the frame assembly. The trolling assembly drives the frame assembly in a generally circular motion about the anchor assembly to simulate a swimming motion of the plurality of decoys.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 6 is a sectional view of the trolling assembly taken along section line A-A of FIG. 4.

Figure 1:
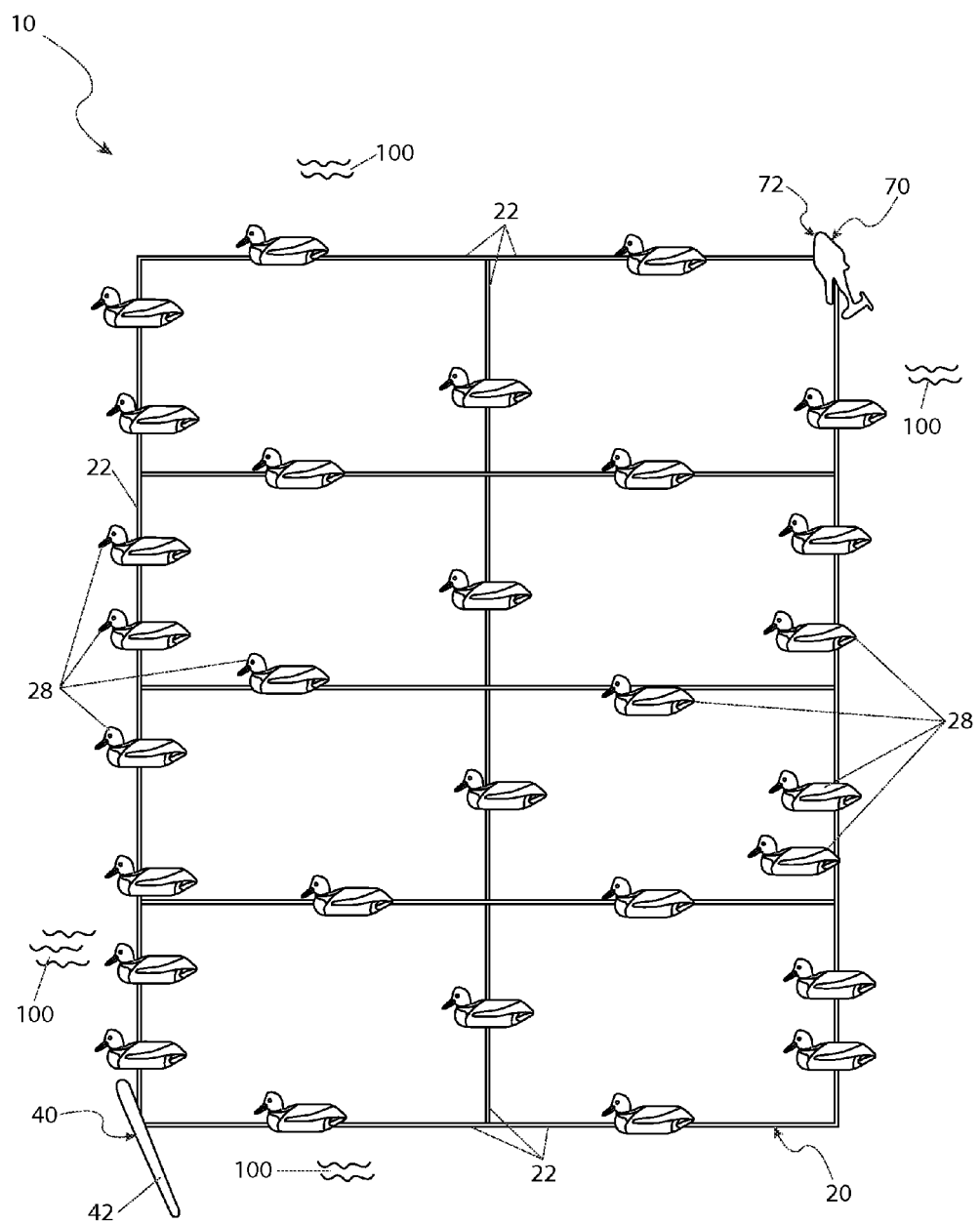
FIG. 1 is a top view of one (1) embodiment of the disclosed decoy trolling apparatus.

DESCRIPTIVE KEY 10 decoy trolling apparatus
20 frame assembly
22 piping
24 fitting
27 hairpin cotter
28 decoy
30 cord
32 frame aperture
40 anchoring assembly
42 post
43 pointed end
44 collar
45 fastener
46 pivot plate
47 ring connector
48 swivel clasp
50 screw eyelet
70 trolling assembly
72 base
73a upper section
73b lower section
74 decoy cover
75 hinge
76 base aperture
78 frame appendage
80 trolling motor
82 propeller
84 mounting tube
85 mounting flange
87 wiring
88 base cavity
90 battery
91 battery terminal
93 selector switch
100 water surface
102 ground surface

DETAILED DESCRIPTION OF THE PREFERRED EMBODIMENT

In accordance with the invention, the best mode is presented in terms of a one or more of the disclosed embodiments, herein depicted within FIGS. 1 through 4. However, the disclosure is not limited to a single described embodiment and a person skilled in the art will appreciate that many other embodiments are possible without deviating from the basic concept of the disclosure and that any such work around will also fall under its scope.

Further, those skilled in the art will recognize that other styles and configurations can be incorporated into the teachings of the present disclosure, and that the example configurations shown and described herein are for the purpose of clarity and disclosure and not by way of limitation.

As used herein, the singular terms "a", "an", and "the" do not denote a limitation of quantity, but rather denote the presence of at least one (1), as well as a plurality of, the referenced items, unless the context clearly indicates otherwise.

As used herein, the terms "first", "second", "third", etc. are used as labels to describe various elements, features, and/or components, and are not intended to impose ordinal, positional, or hierarchical requirements on the referenced items, unless other indicated. For example, such terms may be used to distinguish one (1) element from another element.

As used herein, relative terms such as "front", "rear", "left", "right", "top", "bottom", "below", "above", "upper", "lower", "horizontal", or "vertical" are used to describe a relationship of one (1) element, feature and/or region to another element, feature and/or region as illustrated in the figures.

Referring to FIGS. 1-6, disclosing a decoy trolling apparatus (herein described as the "apparatus") 10, where like reference numerals represent similar or like parts. Generally, the apparatus 10 provides for holding multiple waterfowl hunting decoys 28 while moving them upon a water surface 100 (e.g., in a circular pattern) to simulate a swimming motion to attract flying waterfowl, such as ducks and geese.

Referring to FIG. 1, the apparatus 10 includes a large frame assembly 20. The frame assembly 20 includes a plurality of interconnected lengths of (e.g., PVC) piping (also referred to herein as pipes or piping members) 22. The plurality of lengths of piping 22 are interconnected by a plurality of interconnecting fittings 24. The frame assembly 20 provides for attachment of a plurality of tethered decoys 28. As one (1) example construction, the plurality of decoys 28 are arranged in a grid pattern.

Referring to FIGS. 1-4, an anchoring assembly 40 is connected or affixed to one corner of the frame assembly 20. A trolling assembly 70 is connected or affixed to the frame assembly 20, for example, at a corner opposite the anchoring assembly 40.

Figure 5:
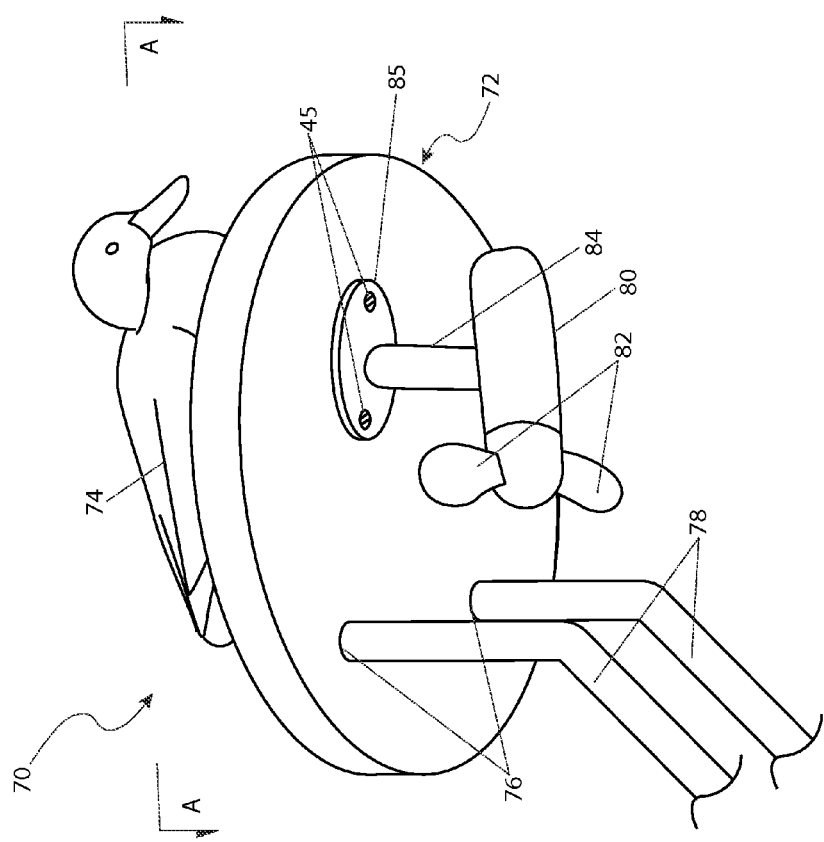
FIG. 5 is a bottom perspective view of the trolling assembly of FIG. 4.

Referring to FIGS. 1 and 5, the trolling assembly 70 includes a small submerged trolling motor 80 and a battery 90 electrically connected to the motor 80. The trolling motor 80 pivots the entire frame assembly 20 along with the decoys 28 about the anchoring assembly 40 in a slow circular pattern on the water surface 100. Thus, the apparatus 10 produces an arrangement and/or motion of the decoys 28 that is much more realistic in appearance than randomly floating decoys. As such, a greater number of flying waterfowl are more likely to investigate the apparatus 10.

Figure 3:
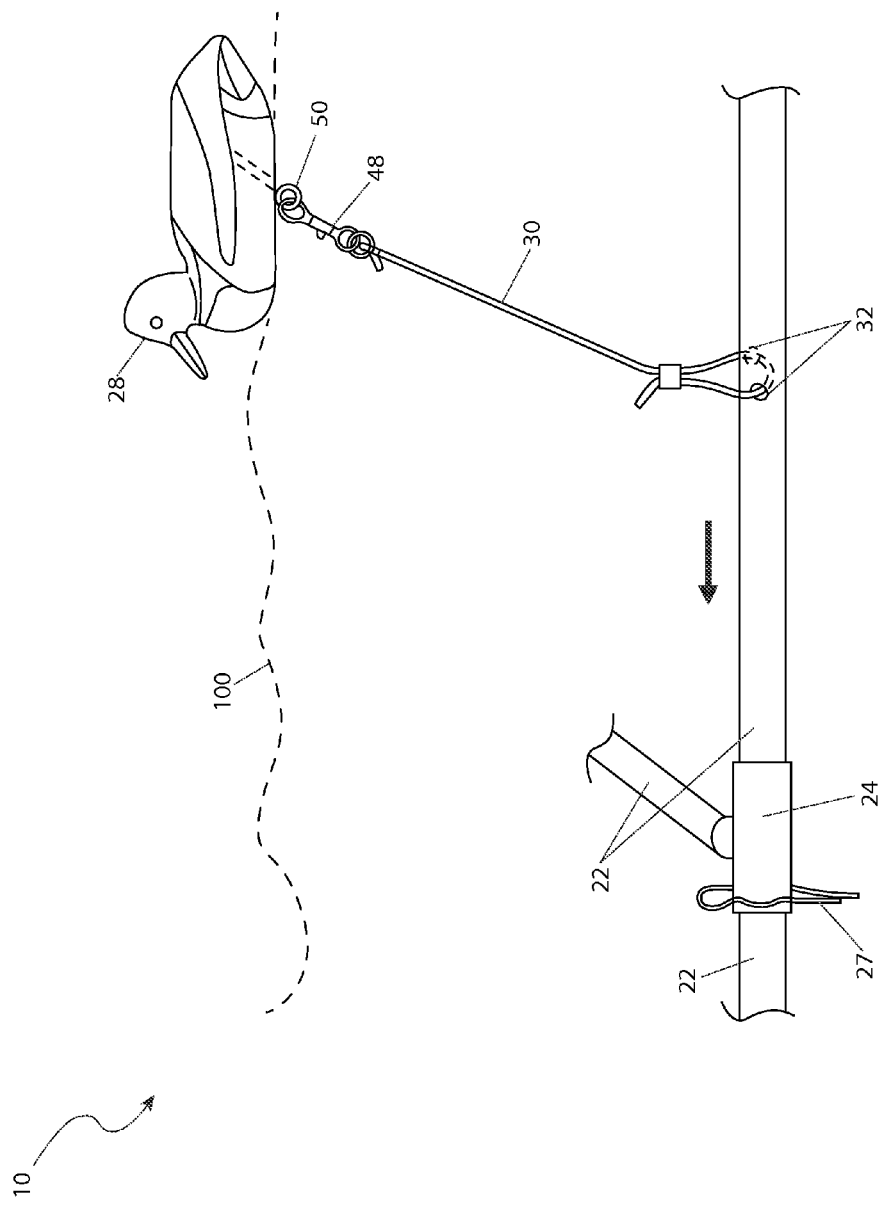
FIG. 3 is a side view of one (1) embodiment of the waterfowl decoy of the decoy trolling apparatus.

Referring to FIGS. 1 and 3, in one example construction, the frame assembly 20 includes piping 22 and interconnecting fittings 24 that are interconnected to form a right-angle matrix to produce a plurality of rectangular openings. As one (1) example, each opening can be sized to be approximately five feet by five feet (5×5 ft.). However, an overall size of the frame assembly 20 and, thus, the size of the individual openings can vary depending on the length, number, and/or configuration of the plurality of piping 22.

Some of the plurality of connections between the piping 22 and the fittings 24 can be affixed together using a waterproof adhesive or the like. Other connections between the piping 22 and the fittings 24 can be removably attached, for example, using hairpin cotters 27 received through frame apertures 32 disposed through the piping 22. Thus, at least certain portions or sections of the frame assembly 20 (e.g., piping 22 and/or fittings 24) can be reconfiguring to expand or reduce the size and/or shape of the frame assembly 20, for example, based upon a user's preference, available size of the water surface 100, and/or a particular hunting scenario.

Use of the hairpin cotters 27 or similar removable fasteners enables easy disassembly and reconfiguring of the frame assembly 20, allows the apparatus 10 to be introduced in various overall sizes, and provides convenient compact storage and packaging of the apparatus 10.

In another example construction, the frame assembly 20 can be coated with color that blends into background colors as to not be noticed by approaching waterfowl, such as dark green, black, camouflage, or the like.

Referring to FIG. 3, the plurality of frame apertures 32 can drilled or otherwise formed along the pipes 22 to enable tethered attachment of decoys 28, for example, by tethering cords 30. In another example construction, the piping 22 can be hollow and can be filled internally with a buoyant material that provides an appropriate amount of buoyancy to enable the frame assembly 20 to float slightly below the water surface 100. In another example construction, the piping 22 can be wrapped externally with a buoyant material that provides an appropriate amount of buoyancy to enable the frame assembly 20 to float slightly below the water surface 100. For example, the buoyant material can include, but is not limited to, polystyrene beads, spray foam, tubular foam rubber sections, and the like. Sand can also be added to the buoyant material.

Figure 2:
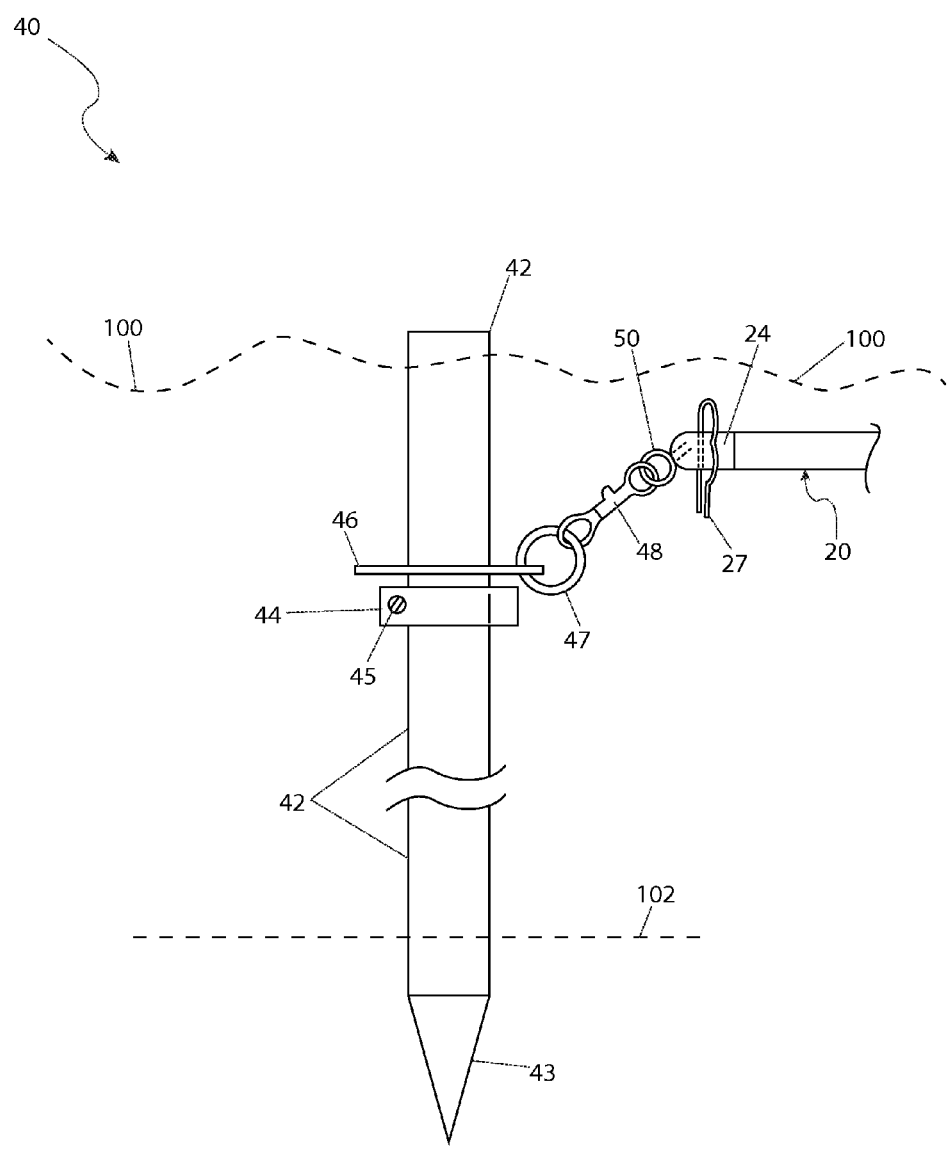
FIG. 2 is a side view of one (1) embodiment of the anchoring assembly of the decoy trolling apparatus.

The frame assembly 20 is designed to rotate continually about an anchoring assembly 40 attached at one (1) corner portion, being propelled thereabout via a trolling assembly 70 which is affixed to a diagonally opposing corner portion (see FIGS. 2 and 4a).

Referring to FIGS. 1 and 2, the frame assembly 20 is motioned in a generally circular pattern by the trolling assembly 70 while corner or corner portion of the frame assembly 20 opposite the trolling assembly 70 is connected to and rotates about the stationary anchoring assembly 40.

Referring to FIG. 2, the anchoring assembly 40 includes a vertical post 42. The post 42 includes a length of (e.g., metal or plastic) pipe having a pointed end 43. The pointed end 43 penetrates a ground surface 102 along a bottom of the body of water, resulting in a stable positioning of the anchoring assembly 40 and the corner portion of the frame assembly 20. The anchoring assembly 40 includes components that provide rotating attachment to the frame assembly 20.

In an example construction, the anchoring assembly 40 includes a clamping collar 44, a pivot plate 46, a ring connector 47, and a swivel clasp 48. The collar 44 includes a circular or "C"-shaped clamp construction that is slidingly positioned in a vertical direction along the post 42. The position of the collar 44 relative to the post 42 depends upon the height of the water surface 100 (e.g., depth of the body of water). The collar 44 can be clamped (e.g., tightened) around the post 42 at the appropriate position by tightening a fastener 45.

The pivot plate 46 includes a relatively large central aperture (not shown) that is suitably sized to receive the post 42. For example, the pivot plate 46 can include a similar construction to that of a large metal washer. The post 42 is inserted through the pivot plate 46. The pivot plate 46 rests upon the collar 44. The connecting ring 47 is movably attached to an edge of the pivot plate 46, for example, through a small peripheral aperture. The swivel clasp 48 is movably connected to the connecting ring 47.

The frame assembly 20 includes a screw eyelet 50 extending from a corner. For example, the screw eyelet 50 can be threadingly installed (e.g., connected) into a corner fitting 24 of the frame assembly 20, such as an elbow fitting. The swivel clasp 48 is removably connected to the screw inlet 50. Accordingly, the frame assembly 20, pivot plate 46, and connecting hardware (e.g., connecting ring 47 and swivel clasp 48) can to rotate freely around the post 42.

Referring to FIG. 3, each decoy 28 can be constructed to provide a lifelike representation of a waterfowl, such as a duck, goose, or the like. For example, the decoy 28 can be made of a flotation material, such as dense polystyrene. In an example commercial embodiment, the apparatus 10 can be purchased together with a plurality of decoys 28 of a desired type and appearance based upon a user's preference. In another commercial embodiment, the apparatus 10 can be utilized with any pre-existing decoys 28 already owned by the user.

Each decoy 28 includes a screw eyelet 50 threadingly or otherwise connected along a (e.g., forward) bottom surface. The screw eyelet 50 enables tethering of the decoy 28 to the frame assembly 20 via removably attached interconnecting members. For example, the decoy 28 can be connected to the frame assembly 20 by a length of flexible cord 30 and a swivel clasp 48. The cord 30 can be made using a strong, thin material, such as monofilament, stainless steel cable, or the like. In an example construction, the cord 30 can be tied, crimped, or otherwise fastened at one (1) end to the screw eyelet 50 of the decoy 28 and at the other end to a frame aperture 32 of the frame assembly 20 (e.g., piping 22 or fitting 24). In an example embodiment, the cord 30 can be approximately twenty inches (20 in.) in length to enable the decoy 28 to present a natural swimming motion.

Referring to FIGS. 1 and. 4, the apparatus 10 is motioned in a circular pattern via removable attachment of the trolling assembly 70 to the frame assembly 20. The frame assembly 20 provides for attachment to the trolling assembly 70 via a pair of parallel frame appendages 78 that protrude along a leading edge of the frame assembly 20. The frame appendages 78 can be made using similar materials as the frame assembly 20 (e.g., the piping 22). The frame appendages 78 are incorporated into a portion (e.g., corner portion) of the frame assembly 20 opposite of the anchoring assembly 40 and extend perpendicularly forward and upward.

Figure 4:
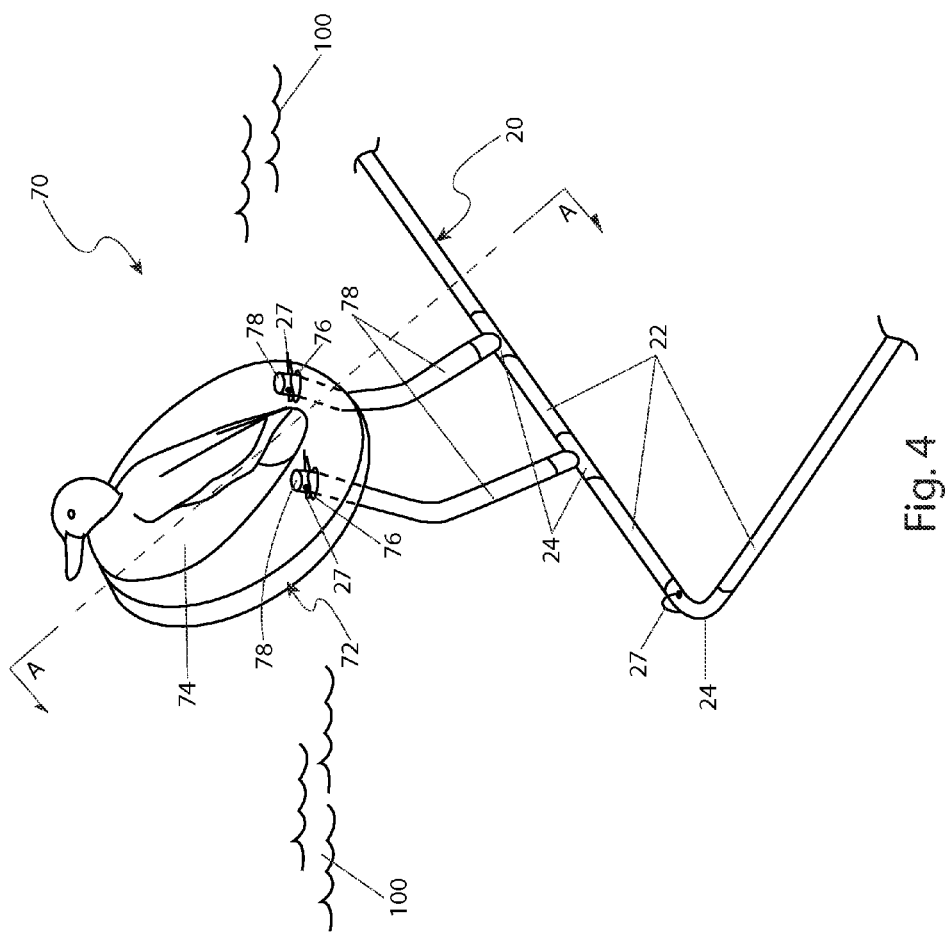
FIG. 4 is a top perspective view of one (1) embodiment of the trolling assembly of the decoy trolling apparatus.

Referring to FIGS. 4 and 5, the trolling assembly 70 includes a circular or oval-shaped base 72. The base 72 includes a pair of vertical and parallel base apertures 76 disposed along a rear portion of the base 72. The base apertures 76 are suitably sized and positioned to slidingly receive the frame appendages 78. Following insertion of the frame appendages 78 within the base apertures 76, respective frame apertures 32 located at an upper end of each frame appendage 78 provide for insertion of respective hairpin cotters 27 to securely fasten the frame assembly 20 to the trolling assembly 70.

Referring to FIGS. 4-6, the base 72 includes a decoy cover 74 connected along a top surface of the base 72, for example, using a rear-mounted hinge 75. The decoy cover 74 has an appearance of a waterfowl decoy and defines a hollow space therewithin to contain equipment necessary to propel the trolling assembly 70 and attached frame assembly 20 along the water surface 100.

Referring to FIG. 6, the base 72 also includes a base cavity 88, which together with the decoy cover 74, act to discreetly enclose the equipment that propels the apparatus 10. The propelling equipment includes a trolling motor 80, a battery 90, and a selector switch 93.

The base 72 includes a buoyant hard foam upper section 73a and a rigid lower section 73b being bonded or otherwise affixed to each other. The lower section 73b covers an entire bottom surface of the base 72 and provides a secure structural surface onto which the trolling motor 80 can be mounted. The trolling motor 80 includes an internal DC motor, a horizontal cylindrical housing, and an integral mounting tube 84 having a mounting flange 85. The trolling motor 80 includes a rearwardly directed propeller 82 and internal wiring 87 that passes up through the mounting tube 84 and into the base cavity 88 of the base 72 where it is connected to the battery 90. For example, the trolling motor 80 can be a commercially-available product, which provides normal and expected features.

Referring to FIGS. 5 and 6, the mounting tube 84 and mounting flange 85 extend perpendicularly upward from the motor 80 or exterior motor housing and can be connected or affixed to the bottom surface of the lower section 73b, for example, using a plurality of fasteners 45. The base cavity 88 contains the battery 90 and the selector switch 93. The battery 90 can be a rechargeable deep-cycle type having positive and negative terminals 91, for example, similar to those used in marine applications, or may utilize an equivalent battery technology that provides durability over repeated discharge cycles. The selector switch 93 is wired in series between the battery 90 and the trolling motor 80. For example, the selector switch 93 can be a toggle or dial type switching device that provides selection of operational functions such as ON/OFF and/or a plurality of variable motor speeds.

The trolling motor 80 can be mounted to the base 72 in any orientation to motion the trolling assembly 70 to give the appearance of the decoy cover 74 traveling in a specific direction.

Those skilled in the art will recognize that other styles and configurations of the disclosed apparatus 10 can be easily incorporated into the teachings of the present disclosure, and only particular configurations have been shown and described for purposes of clarity and disclosure and not by way of limitation of scope.

The disclosed embodiments of the apparatus 10 can be utilized by the common user in a simple and effortless manner with little or no training. After initial purchase or acquisition of the apparatus 10, it would be installed as illustrated in FIGS. 1-4.

One embodiment of the disclosed method for installing and utilizing the apparatus 10 includes the following steps: 1). procuring a model of the apparatus 10 having a particular number of pipes 22 and fittings 24 to produce a desired overall size and a desired number and type of decoys 28; 2). assembling the frame assembly 20 by inserting and/or connecting the piping 22 and fittings 24 together and securing appropriate locations with the hairpin cotter's 24; 3). charging and installing the battery 90 into the base cavity 88 of the trolling assembly 70; 4). connecting the wiring 87 to the battery terminals 91; 5). attaching the trolling assembly 70 to the frame assembly 20 by inserting the frame appendages 78 through the base apertures 76; 6). securing the frame appendages 78 using hairpin cotters 24; 7). installing the anchoring assembly 40 into the body of water by forcing the pointed end 43 of the post 42 into the ground surface 102; 8). inserting the post 42 of the anchoring assembly 40 through the pivot plate 46; 9). placing the frame assembly 20 onto the water surface 100; 10). attaching the anchoring assembly 40 to the frame assembly 20 by attaching the swivel clasp 48 of the anchoring assembly 40 to the screw eyelet 50 of the frame assembly 20; 11). tying or crimping a desired number of cords 30 to frame apertures 32 of the frame assembly 20, if not previously installed; 12). attaching a desired number of decoys 28 to the cords 30 using the swivel latch 48 and screw eyelet 50; 13). tilting the decoy cover 74 upward about the hinge 75; 14). switching the selector switch 93 from the "OFF" position to a desired motor speed setting; 15). replacing the decoy cover 74; 16). allowing the frame assembly 20, decoys 28, and the trolling assembly 70 to assume a slow steady circular motion about the anchoring assembly 40; and 17). assuming a hunting or wildlife observation position.

Accordingly, the disclosed apparatus 10 benefits the user by providing a more realistic arrangement of decoys 28, which provides an effective attractant to flying waterfowl.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A decoy trolling apparatus comprising:
a frame assembly configured to float on a water surface;
a trolling assembly connected to a first location of said frame assembly; and,
an anchor assembly connected to a second location of said frame assembly and anchored to a ground surface below said water surface, said second location being opposed to said first location, comprising:
a post configured to penetrate said ground surface;
a collar connected to said post;
a pivot plate movably connected to said post and supported by said collar; and,
a swivel clasp connected to said pivot plate and said frame assembly;
wherein said frame assembly is configured for attachment of a plurality of decoys; and,
wherein said trolling assembly drives said frame assembly in a generally circular motion about said anchor assembly.

2. The apparatus of claim 1, wherein said frame assembly is suitably buoyant to float directly below said water surface.

3. The apparatus of claim 1, wherein said frame assembly comprises an interconnected plurality of piping members.

4. The apparatus of claim 3, wherein said plurality of piping members are connected together by a plurality of fittings.

5. The apparatus of claim 3, wherein said plurality of piping members comprises a hollow interior filled with a buoyant material suitable to float said frame assembly directly below said water surface.

6. The apparatus of claim 3, wherein said plurality of piping members comprises a buoyant exterior cover suitable to float said frame assembly directly below said water surface.

7. The apparatus of claim 1, wherein said frame assembly forms a grid pattern defined by an interconnected plurality of piping members defining a plurality of openings therebetween.

8. The apparatus of claim 7, further comprising said plurality of decoys, said plurality of decoys being connected to said plurality of piping members and floated upon said water surface.

9. The apparatus of claim 1, wherein said trolling assembly comprises:
a base comprising an upper surface and a lower surface;
a trolling motor connected to said lower surface of said base; and,
a decoy cover connected to said upper surface.

10. The apparatus of claim 1, wherein said frame assembly further comprises a frame appendage extending outwardly and upwardly from said first location, said frame appendage being connected to said trolling assembly.

11. A decoy trolling apparatus comprising:
a frame assembly floatable on a water surface;
a plurality of decoys connected to said frame assembly and floatable on said water surface;
a trolling assembly rigidly connected to a first location of said frame assembly; and,
an anchor assembly rotatably connected to a second location of said frame assembly and anchored to a ground surface below said water surface, said second location being opposed to said first location, comprising:
a post configured to penetrate said ground surface;
a collar connected to said post;
a pivot plate movably connected to said post and supported by said collar; and,
a swivel clasp connected to said pivot plate and said frame assembly;
wherein said trolling assembly drives said frame assembly in a generally circular motion about said anchor assembly.

12. The apparatus of claim 11, wherein said frame assembly comprises a buoyant material suitable to float said frame assembly directly below said water surface.

13. The apparatus of claim 11, wherein said frame assembly comprises a plurality of piping members connected together by a plurality of fittings to form a grid pattern defining a plurality of openings therebetween, and wherein said plurality of decoys are connected to said plurality of piping members by a plurality of tether cords in said grid pattern upon said water surface.

14. The apparatus of claim 13, wherein said plurality of piping members is removably connected to said plurality of fittings.

15. The apparatus of claim 11, wherein said trolling assembly comprises:
a base comprising an upper surface and a lower surface;
a trolling motor connected to said lower surface of said base; and,
a decoy cover connected to said upper surface.

16. The apparatus of claim 15, wherein said trolling assembly further comprises:
an internal power supply disposed within said decoy cover and electrically connected to said trolling motor; and,
a selector switch electrically interconnected between said power supply and said trolling motor.

17. The apparatus of claim 15, wherein said base comprises:
a foam upper section defining said upper surface; and,
a rigid lower section defining said lower surface.

18. A decoy trolling apparatus comprising:
a rectangular frame assembly comprising a first end comprising at least one first corner and an opposed second end comprising at least one second corner, said at least one second corner being diagonally opposed to said at least one first corner, said frame assembly further comprising:
a plurality of piping members removably interconnected by a plurality of fittings to form a rectangular grid pattern defining a plurality of rectangular openings between said plurality of piping members;
a buoyant material coupled to at least said plurality of piping members to float said frame assembly directly below said water surface; and,
a frame appendage extending outwardly and upwardly from said at least one first corner;
a plurality of decoys being floatable on said water surface, said plurality of decoys comprising an appearance of a water fowl, and said plurality of decoys being releasably connected to said plurality of piping members in said grid pattern upon said water surface;
a plurality of tether cords releasably interconnected between said plurality of decoys and said plurality of piping members;
a trolling assembly comprising:
a base assembly rigidly connected to said frame appendage, said base assembly comprising a foam upper section defining an upper surface and a rigid lower section defining a lower surface;
a mounting tube extending downwardly from said lower surface of said lower section of said base assembly;
a trolling motor connected to said mounting tube, said trolling motor comprising an exterior motor housing, a motor disposed within said motor housing, and a propeller operatively connected to said motor;
a decoy cover hingedly connected to said upper surface of said upper section of said base assembly, said decoy cover comprising an exterior shell defining a hollow interior, said exterior shell comprising an appearance of said water fowl;
an internal power supply disposed within said interior of said decoy cover, said power supply being electrically connected to said motor, and,
a selector switch electrically interconnected between said power supply and said motor; and,
an anchor assembly comprising:
a cylindrical post comprising a first end and an opposed second end, said second end of said post comprising a pointed end configured to penetrate a ground surface below said water surface;
a cylindrical collar stationarily connected around said post between said first end and said second end of said post;
a circular pivot plate rotatably connected to said post and supported by said collar, said pivot plate comprising a central aperture suitably sized to receive said post;
a ring connector movably connected to a peripheral edge of said pivot plate; and, a swivel clasp comprising a first end connected to said ring connector and an opposed second end releasably connected to a piping member of said plurality of piping members at said at least one second corner of said frame assembly;

wherein said trolling assembly drives said frame assembly in a generally circular motion about said anchor assembly to simulate a swimming motion of said plurality of decoys.

\* \* \* \* \*